(12) United States Patent
Giallorenzi et al.

(10) Patent No.: US 7,602,834 B1
(45) Date of Patent: Oct. 13, 2009

(54) SYSTEM AND METHOD FOR DETERMINING A FINE FREQUENCY OFFSET OF A RECEIVED SIGNAL

(75) Inventors: Thomas R. Giallorenzi, Herriman, UT (US); Johnny M. Harris, Centerville, UT (US); Dan M. Griffin, Bountiful, UT (US); Sam Kingston, Salt Lake City, UT (US)

(73) Assignee: L-3 Communications, Corp., New York, NY (US)

( * ) Notice: Subject to any disclaimer, the term of this patent is extended or adjusted under 35 U.S.C. 154(b) by 572 days.

(21) Appl. No.: 11/540,139

(22) Filed: Sep. 28, 2006

(51) Int. Cl.
*H04B 1/00* (2006.01)
(52) U.S. Cl. .................. 375/130; 375/136; 375/142; 375/143; 375/147; 375/150; 375/152
(58) Field of Classification Search .......... 375/130, 375/136, 142, 143, 147, 150, 152, 343–344
See application file for complete search history.

(56) References Cited

U.S. PATENT DOCUMENTS

| 4,776,012 A | 10/1988 | Zscheile, Jr. et al. |
| 5,495,509 A | 2/1996 | Lundquist et al. |
| 6,141,373 A | 10/2000 | Scott |
| 6,882,691 B2 | 4/2005 | Chiodini |
| 6,885,241 B2 | 4/2005 | Huang et al. |
| 6,952,440 B1 | 10/2005 | Underbrink |
| 2004/0264554 A1* | 12/2004 | Harms et al. ............... 375/147 |
| 2005/0147191 A1 | 7/2005 | Geier et al. |

* cited by examiner

*Primary Examiner*—Curtis B Odom
(74) *Attorney, Agent, or Firm*—Kirton & McConkie; William T. Ralston

(57) ABSTRACT

A system and method for determining a fine frequency offset of a composite code spread spectrum signal is disclosed. The method includes despreading at least one component of the composite spread spectrum signal to form a partially despread composite spread spectrum signal. A set of on-time samples are selected from the signal. The set of on-time samples are rotated by a predetermined frequency amount. The set of rotated samples are placed into a plurality of frequency bins, with each frequency bin representative of a different frequency estimate. An energy for the signal in each frequency bin is determined to find the bin having the greatest energy.

22 Claims, 13 Drawing Sheets

SYSTEM AND METHOD FOR DETERMINING A FINE FREQUENCY OFFSET OF A RECEIVED SIGNAL

BACKGROUND

A common problem in modern ad-hoc wireless communications networks is that individual nodes need to recognize each other's existence, and possibly each other's locations, to be able to join together to form a network. In military communications systems fast and covert node identification and recognition means can help prevent friendly fire incidents.

Once a network is established, new nodes often need to join the existing network. The nodes need a way to do this without compromising their own security, or the security of the network they are joining. Additionally, an established network typically can discover the existence of another separate network that has migrated into communication range, so that a cross-link can be established between the networks to form a larger network. This process of nodes finding each other is called node discovery.

There are many ways that node discovery can be performed. A good node discovery scheme for an encrypted or secret communications network has a number of properties, including permitting fast and reliable network entry, being covert, secure and jam proof, as well as having a range that exceeds the network itself. One procedure used to accommodate these desired properties is to spread a carrier signal to form a spread spectrum signal.

Spread spectrum techniques have proven useful in a variety of communications applications, including cellular telephones, wireless networks, and military communications. One advantage provided by spread spectrum techniques is the ability to transmit a spread spectrum signal which is difficult for an unauthorized user to detect.

Wireless spread spectrum systems operate by using a relatively large amount of spectrum bandwidth to communicate signals. The large bandwidth is consumed by spread spectrum encoding the message data using a pseudonoise (PN) code. The two most common types of spread spectrum transmission are frequency hopping, where the pseudonoise code is used to pseudo randomly change the transmission frequency on a periodic basis, and direct sequence, where the pseudonoise code is used to modulate the transmit signal at a relatively high rate compared to the underlying message data rate.

In order to detect a spread spectrum transmission, it is generally necessary to know the pseudonoise code beforehand. Furthermore, to extract the message data, it is generally necessary to know the timing of the pseudonoise code. For example, in a direct sequence system, this can be accomplished by knowing the code frequency, also known as the chip rate (rate at which the pseudonoise code advances through its sequence), and the starting time of the pseudonoise code (sometimes referred to as the phase of the code). A signal for which the spread spectrum receiver knows the pseudonoise code, pseudonoise code phase, and pseudonoise code frequency can be referred to as a synchronized signal.

Correlation can be used to detect a spread spectrum transmission and to extract the data from a spread spectrum transmission. Correlation typically performs a chip by chip comparison between a received signal and a local code reference, summing these comparison results over many chip intervals, the overall length referred to as the "correlation interval." For example, to extract data, a receiver typically performs a correlation of the spread spectrum signal with the spreading code over a correlation interval corresponding to one symbol of underlying information. If the so-called processing gain is high (many spreading code chips for each information symbol), this correlation interval may span an interval of many chips. For example, systems are known which use processing gain in excess of 1000, in which case each symbol spans 1000 chips. For detecting a spread spectrum transmission, even longer correlation intervals are often used which span many symbols and, thus, many thousands of chips.

Achieving synchronization with a spread spectrum signal can be difficult, in part due to high pseudonoise code rate (frequency). For example, a relatively low message data rate of 1,000 bits per second might be spread spectrum encoded with a relatively high pseudonoise code rate of 10,000,000 chips per second, where a bit of the pseudonoise code is referred to as a chip. In this example, the ratio of 10,000,000/1,000=0.10,000 is the processing gain. A spread spectrum receiver for this signal will need to synchronize to the high pseudonoise code rate being used by the transmitter, and hence the spread spectrum receiver requires a factor of 10,000 higher synchronization accuracy than a non-spread spectrum system. The difficulty of achieving this synchronization increases as the processing gain increases.

In order to limit the difficulty of synchronizing spread spectrum systems, various techniques have been used. These techniques include the use of very stable oscillators to generate the carrier frequency on which the transmission is centered, the use of very stable clocks to generate the pseudonoise code, and the transmission of special pilot signals or long preambles of known data to aid receiver in synchronization.

Another property of spread spectrum systems is a generally low probability of detection by a user lacking knowledge of the pseudonoise code. This is because the transmitter power of the spread spectrum signal is spread out over a relatively large portion of radio spectrum. By using a high processing gain, it is possible to sufficiently spread the transmitter power out so that the resulting transmission spectral power density is below the noise level within the environment. In general, it is more difficult to detect a spread spectrum signal without knowledge of the pseudonoise code as the processing gain is increased, making the use of high processing gain desirable. Unfortunately, higher processing gains also make acquisition of the spread spectrum signal more difficult for authorized receivers that know the pseudonoise code.

A particular challenge exists in a spread spectrum system which has moving platforms. When the transmitter and receiver are moving relative to one another, a Doppler shift occurs. The Doppler shift is a change in the frequency of the spread spectrum signal with respect to the receiver. The signal is shifted in a manner similar to a perceived change in pitch of a train whistle as it proceeds past a stationary person. The change in frequency is relatively small for slow moving platforms, such as cars, since the change in frequency is proportional to the speed of the platform relative to the speed of light.

However, for relatively fast moving platforms, such as a transmitter mounted on one aircraft moving at 500 nautical miles per hour and a receiver mounted on another aircraft moving in the opposite direction at 500 nautical miles per hour, there can be a relatively large shift in frequency. For example, a transmitter having an imperfect clock with an error of 0.05 parts per million that transmits a signal on a 10 GHz carrier frequency to a receiver moving at a speed of 1000 knots relative to the transmitter will have a 17,600 Hz shift in frequency. If the relative speed difference between the receiver and transmitter is unknown, the Doppler shift can substantially complicate receiving a spread spectrum signal.

One approach to detecting a node in a wireless ad-hoc communication system is to enable each node to transmit a detection burst. The burst can be relatively short in length and well below a noise floor to reduce the probability of detection by unwanted persons. However, detection, synchronization, and correlation of a short length pseudonoise burst having a relatively large Doppler shift can be quite challenging. A receiver is faced with a considerable challenge in detecting these short message transmissions which have an unknown start time. Since the message transmissions are short, there is a limited amount of time to detect the message. Traditional approaches which sequentially search a plurality of hypothesized start times can prove ineffective at detecting these short transmissions, since the transmission may occur while the searching is being done using a different hypothesized start time than that of the transmission.

The problem just described is further aggravated when the transmitters are designed to achieve low cost. Hence, the oscillators used may provide relatively low accuracy and stability, resulting in carrier frequency offsets and code frequency offsets. Furthermore, the code frequency offset may be unrelated to the carrier frequency offset due to a combination of different oscillators and Doppler effects. Accordingly, a receiver is faced with a challenging problem of detecting the transmissions.

SUMMARY

A system and method for determining a fine frequency offset of a composite code spread spectrum signal is disclosed. The method includes despreading at least one component of the composite spread spectrum signal to form a partially despread composite spread spectrum signal. A set of on-time samples are selected from the signal. The set of on-time samples are rotated by a predetermined frequency amount. The set of rotated samples are placed into a plurality of frequency bins, with each frequency bin representative of a different frequency estimate. An energy for the signal in each frequency bin is determined to find the bin having the greatest energy.

DETAILED DESCRIPTION OF EXAMPLE EMBODIMENT(S)

Figure 1:
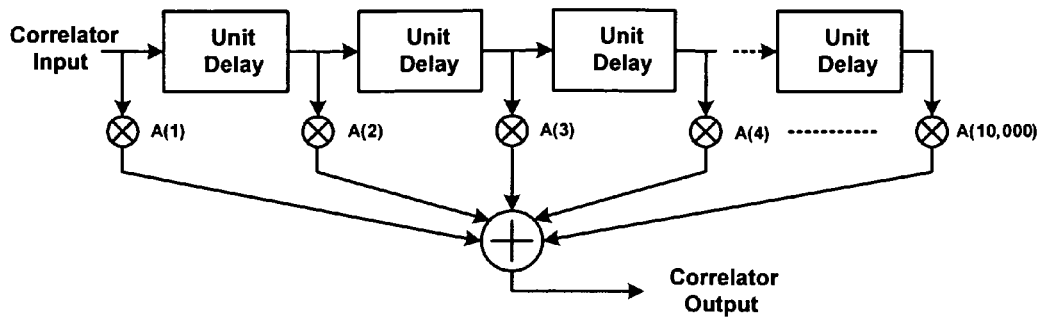
FIG. 1 is a block diagram illustrating a single stage correlator.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In accordance with an embodiment of the present invention, a system and method for detecting a presence and frequency offset of a spread spectrum radio frequency signal is disclosed. The system can be configured to detect one or more transmission bursts from a plurality of relatively fast moving nodes in an ad-hoc wireless communication system.

The system, as shown in various embodiments in FIGS. 7a-9, can detect transmission bursts from transmission nodes that are "clock-unaware", which lack an internal clock. These clock-unaware nodes can transmit using an Asynchronous Discovery Channel. Alternatively, clock-aware transmitting nodes having a sense of time can transmit bursts using a Synchronous Discovery Channel.

The transmissions on either discovery channel can consist of bursts of spread spectrum signals. In one embodiment, the spread spectrum signal can be a direct-sequence spread BPSK signal having complex QPSK spreading codes, though it can be appreciated that a variety of different modulation and spread spectrum schemes can be used. The transmission nodes can use a selected chip rate necessary to achieve the desired spreading. For example, in one embodiment a chip rate of roughly 10 Mega-chips-per-second (Mcps) can be used. The chip rate does not need to be fixed. An adaptive chip rate may be used and can potentially be much higher than 10 Mcps. Complex QPSK spreading and BPSK modulation can be used to create a waveform that typically cannot be detected with a square law detector.

The data rate of the discovery channel can be relatively low, such as 1000 bits per second (bps). This implies a processing gain of 10 Mcps/1000 bps, or 40 dB. A higher processing gain of 50 dB or more can be used where a lower probability of detection is desired. The data rate may be variable over time, such as a rate that can vary between 500 to 2000 bits per second. The burst transmissions may begin at any time. For example, the transmissions may not be tied to any clock epochs or slot times.

The discovery channel bursts from node transmitters can carry payload information such as an encryption sync word and an encrypted Internet Protocol (IP) packet that can contain information about the node and its operational status. For example, the IP packet can include the transmitting node's ID number, location, velocity, direction of travel, and a message indicating that the node is looking to join a network.

The transmitting nodes can include one or more discovery receivers having a search engine, a microprocessor, and a pool of burst receivers. The search engine's job is to continuously search for potential incoming bursts. The search engine can report information to a processor concerning any candidate burst. This information can include the burst's estimated carrier frequency, PN chip frequency and PN chip phase. The processor can then assign one member of a pool of N simultaneous burst receivers to investigate the candidate burst. The processor can report the information to the burst receiver to enable it to acquire the burst. The burst can comprise two sections, a preamble section and a payload section. In one embodiment, the preamble section can be less than 25% of the total burst length. For example, the preamble section may be roughly 250 symbols out of a total burst that is roughly 1200 symbols long. The burst receiver can then lock onto the incoming burst and demodulate the payload information.

In order to increase the probability of receiving the burst with such a short preamble and a very low receiver complexity, a composite or multilayered PN code can be used. The composite PN code can be configured to periodically repeat. The rate of repetition can be dependent upon the processing gain of the PN code. For example, with a processing gain of 40 dB the structured PN code can be configured to repeat every 10,000 chips. A greater processing gain, such as a 50 dB gain, may repeat every 100,000 chips. An epoch may be placed on the symbol boundary.

To enable a fast acquisition, an efficient implementation of a parallel correlator can be used in the receiving node's discovery channel search engine to search every possible PN code phase and every Doppler frequency bin. A brute force pseudo-noise correlation accumulation (PNCA) bin search may be used to search the code phase and Doppler frequency bins. An improvement over the brute force PNCA bin searcher is incorporated in an Accumulated Cross Product (ACP) search engine. The ACP search engine architecture can provide a search engine having a reduced complexity than the brute force PNCA bin search engine while achieving substantially similar performance levels. This will be described more fully below.

The preamble of the discovery channel bursts can be a pseudo-random pattern, which can be known in advance by both the transmitting nodes and the receiving node, making it possible for the receiving node to resolve its carrier loop phase uncertainty and location in the preamble as soon as a lock has occurred.

Even if there were no Doppler shifts of the carrier and chip frequencies and perfect clocks were used at both ends of a node link, the problem of finding PN chip phase alignment can be daunting. An ideal solution would be to use a very long PN code that repeats infrequently. However, a compromise on a shorter length PN code for the preamble of this discovery channel can substantially simplify the search space by limiting the PN code to repeat, for example, every symbol during the preamble. The payload section of the discovery channel burst can employ a long PN code, which provides a greater security level for the payload data than would be possible if the shorter preamble code were used for the payload as well.

Composite Codes

Longer code sequences create implementation challenges in that they require more memory in both the transmitter and receiver and more computation time and power in the receiver during the detection (correlation) process. One technique useful in providing a substantially long code sequence while minimizing the amount of memory used is to generate a long code sequence from a plurality of shorter sequences, or component sequences. The technique can be used to create a long composite code from two or more component codes (subcodes) each having the same or a unique length. The composite code will have a length equal to the product of the lengths of the component codes. This method generates a structure in the composite code that can be exploited to simplify implementation and significantly reduce the computational requirements during the detection process.

The simplest composite code can be created from two component codes. For example, component code A can contain N elements and component code B can contain M elements. The elements of each component code can be a real or complex valued quantity. Typically, each element takes on the real value of either 1 or −1. The first N elements of the composite code (AB) are generated by multiplying each element of component code A with the first element of component code B. The next N elements of AB are created by multiplying component code A with the second element of component code B, and so on. It is apparent that the rate of the B component code is 1/N the rate of the A component code and that the composite code is complete after M repetitions of the N-length A code. Composite code AB is then N×M in length and is non-repetitive in its length if component codes A and B are each non-repetitive in their own lengths.

This composite code generation technique can be used with a plurality of component codes. For example, assume a third component code, C, of length K is used with component codes A and B above. The first N×M elements of third component code C, of length K is used with component codes A and B above. The first N×M elements of composite code ABC can be generated by multiplying code AB by the first element of component code C.

Code AB can then repeat with the second element of C, and so on. Component code C will run at 1/(NM) the rate of component code A, and the length of ABC is N×M×K.

A significant advantage of this technique is the simplification of the matched filter or correlator in the detector (receiver). For example, a PN code of length 10,000 typically requires a matched filter, as shown in FIG. 1, having a 10,000 length delay line and storage of 10,000 filter coefficients. The code shifts (slips) across the delay line one element (or chip) at a time. Each time the code is slipped one chip, 10,000 multiplies and 10,000 additions are required to produce the correlated value at the output for that slip value. For codes running at high rates, this places a large a large computational demand on a system. If half chip timing were used, the complexity would be doubled again.

Figure 2:
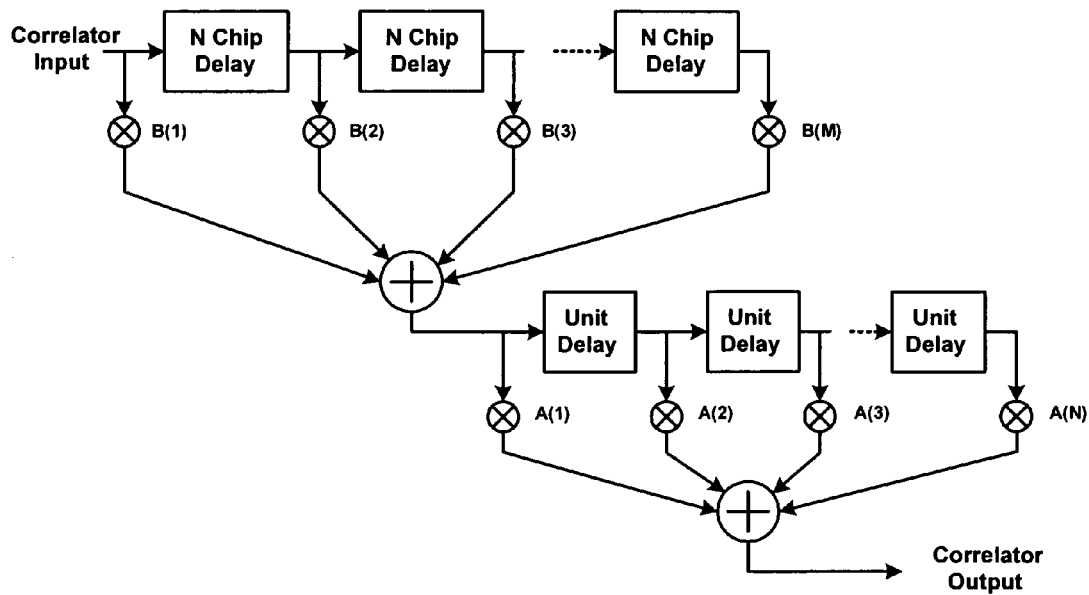
FIG. 2 is an N-stage correlator for use with a composite code comprised of N component codes in accordance with an embodiment of the invention.

The use of an n-stage structure in conjunction with a composite code made from n component codes provides significant advantages. For example, as shown in FIG. 2, a two-stage structure can be used to correlate a composite code comprising component code A having length N and component code B having length M that will produce a composite code having a length of N×M. The N×M length composite code also shifts across a delay line of length N×M. However, only M taps and tap-weight multiplies (corresponding to the B component code) are used and are spaced N chips apart (corresponding to the length of the A component code). These M products are added for each delay element (N total additions). This implementation performs the same "matched filter" function as the "brute force" method of FIG. 1 for the same code of length N×M. The n-stage structure will be referred to as a composite matched filter.

To examine the reduction in computational complexity using the composite matched filter, assume a 10,000-length code is used and is created from two 100-length component codes. Using the method shown in FIG. 2, 10,100 delay elements (10,000 for the first stage +100 for the second stage) are used, slightly more than the method of FIG. 1. However, only 200 (N+M) tap weights are stored and only 200 multiplies and additions are required for each output value (each slip). In most implementations, the small increase in the number of delay elements is more than offset by the reduction in multiply and addition functions since these functions usually require a larger amount of combinational logic than a simple delay element.

Composite codes and composite matched filters are not limited to two stages but can be generalized for composite codes made from any number of component codes. For example, if three component codes are used (of length N, M, and K), a "three stage" composite matched filter can be used. The first stage can be implemented using K delay lines of length N×M with K taps. The second stage can be implemented using M delay lines of length N with M taps, and the final stage would need N units of delay with N taps. This case would require N+M+K multiplies and additions for each "slip" compared to N×M×K multiplies and additions for a conventional correlator for the same code.

For the detection process, the composite matched filter can be applied to matched filters with finer resolution than single "chip" slips. For example, if a detector with ½ chip increments is desired, the input rate at the detector will double and all delay lines of every stage will double in the number of delays. However, all taps, tap multiplies, and additions at each stage will remain the same as single chip slips. The final stage can use a tap, tap multiply, and addition for each delay element.

Thus, the composite code generation algorithm and the composite matched filter greatly reduce the amount of memory and computational complexity needed for both generation and detection of random sequences.

Doppler Bin Searches

If the nodes in the ad-hoc network were to remain stationary and they were to have clocks that are tied together, then the acquisition of the bursts would be relatively simple to accomplish. However, when the nodes move at rates of up to ±500 nm i/hr=1852 km/hr and have imperfect 0.05-ppm clocks, the Doppler shift and clock offsets are significant. The Doppler shift can be determined according to the equation $$\frac{\Delta V f_c}{c},$$

where $\Delta V$ is the change in velocity, $f_c$ is the carrier frequency and c is the speed of light. The Doppler shift plus clock offsets due to the imperfections in the clock are equivalent to almost 21.2 kHz at a 12 GHz carrier frequency.

Searching for an incoming burst is similar to searching a two dimensional space consisting of the timing of the burst and the phase of the chips in the PN code. The Doppler shift effectively adds an additional dimension of the chip frequency to a search algorithm for detecting incoming bursts. The search volume can be divided into bins to enable more rapid detection and correlation.

The number of bins in the chip phase dimension is directly related to processing gain. A system employing 40 dB of processing gain can use a PN code having a length of 10,000 chips. Assuming a half chip resolution on the composite matched filter, there will be 20,000 different chip phase bins. The number of carrier frequency bins can be determined according to the equation $B_{carrier\ bins}=2\Delta f_c/(R_s/2)$, wherein $\Delta f_c$ is the Doppler plus clock offset value and $R_s$ is the symbol rate. Assuming a symbol rate of 1,000 symbols per second and the Doppler plus clock offset value of 21.2 kHz above, the number of carrier frequency bins is approximately 85 for a 12 GHz carrier frequency.

The number of chip frequency bins is related to a worst case scenario for chip clock shift over a dwell time due to Doppler shift. The uncompensated Doppler shift of the chip clock is determined according to $\Delta V R_c/c$, where $\Delta V$ is the change in velocity due to Doppler (1852 km/hr) and $R_c$ is the chip rate (10,000,000 chips per second), for a chip clock Doppler shift of approximately ±15 Hz. The total chip clock offset also has to account for potential inaccuracy in the clock of 0.05 ppm, for a total chip clock offset $\Delta R_c$ (Doppler plus clock offset) of approximately ±15.5 Hz. The worst case of a chip clock shift over a dwell time can be determined according to $\Delta T_c=\Delta R_c M_{dwell}/R_s$, where $M_{dwell}$ is the symbol dwell interval. Assuming a dwell interval of 50 symbols (50 ms), the $\Delta T_c=0.78$. This implies that the autocorrelation peak can drift by up to ±0.78 chips during a 50 symbol dwell interval. The number of chip Doppler bins can be determined by $B_{chip\ bins}=2\Delta T_c=1.56$ bins, or approximately 2 bins.

Figure 3:
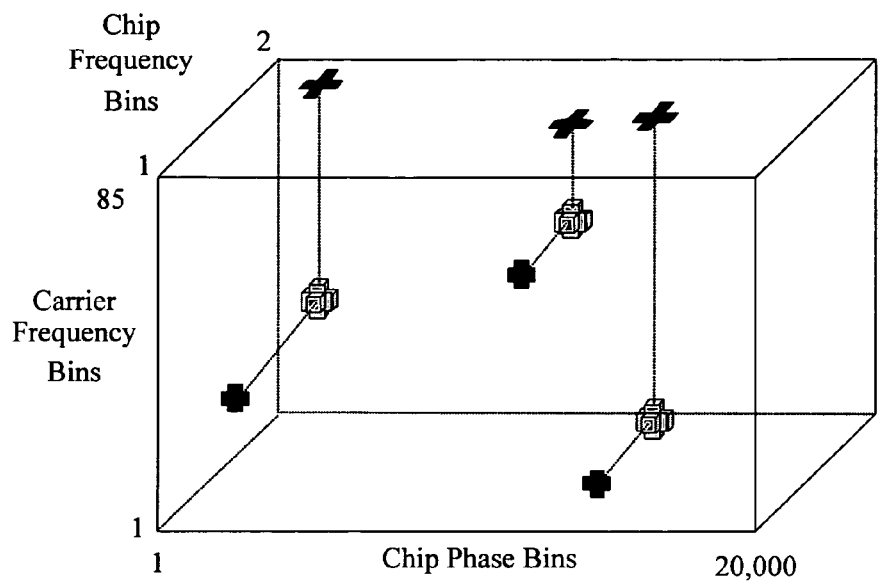
FIG. 3 is an illustration of an "uncertainty cube" used to represent three dimensions that can be searched to ensure that a discovery channel burst is reliably captured in accordance with an embodiment of the invention.

The carrier and chip frequency bins represent the uncertainty that can be searched by the receiving node's discover channel search engine during the preamble. FIG. 3 illustrates an "uncertainty cube" that represents the three dimensions that are searched to insure that every discovery channel burst is reliably captured. The total number of bins that can be searched within the uncertainty cube is 2*85*20,000=3,400,000 bins. Continuously searching this number of bins can be a daunting task.

Figure 4:
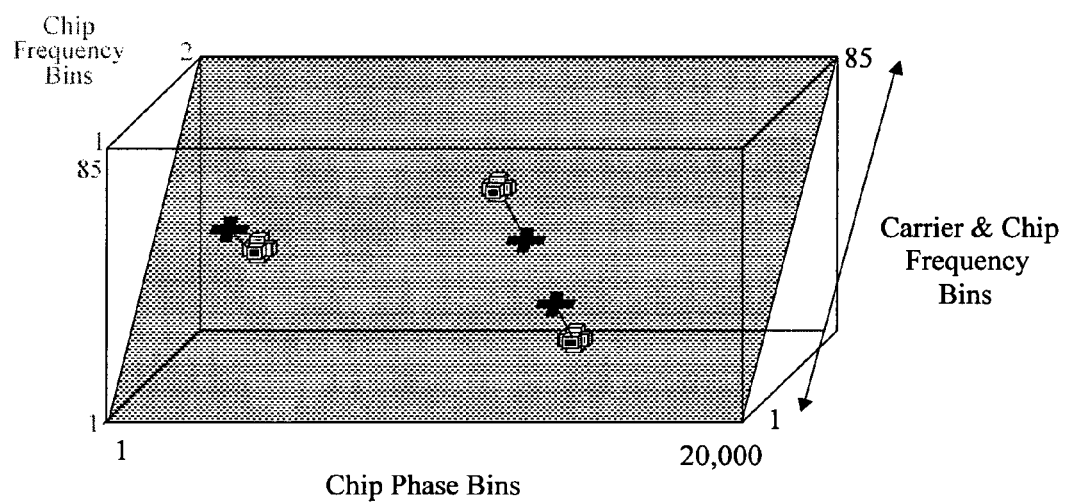
FIG. 4 is an illustration of an "uncertainty surface" when clocks of a transmitter and receiver are tied together in accordance with an embodiment of the invention.

Alternatively, the number of bins can be reduced by tying the chip clock and carrier clocks together, enabling the transmitting node to be a clock slave. There are a number of ways to tie the clocks together. In one embodiment, the transmitting node can source the data clock to whatever device provides the data. In this case, since the data clock is created from the same reference as the carrier clock, if the reference is high, both the chip and carrier frequencies will be high. Similarly, Doppler shifts due to motion also will affect both clocks in the same direction. Alternatively, the chip clock and the carrier local oscillator can be created from the same source. Another approach is to use an external clock for both the carrier and chip reference. Tying the clocks together can reduce the uncertainty and allows the uncertainty cube of FIG. 3 to become an uncertainty surface, as shown in FIG. 4.

PNCA Search Engine Architecture

Figure 5:
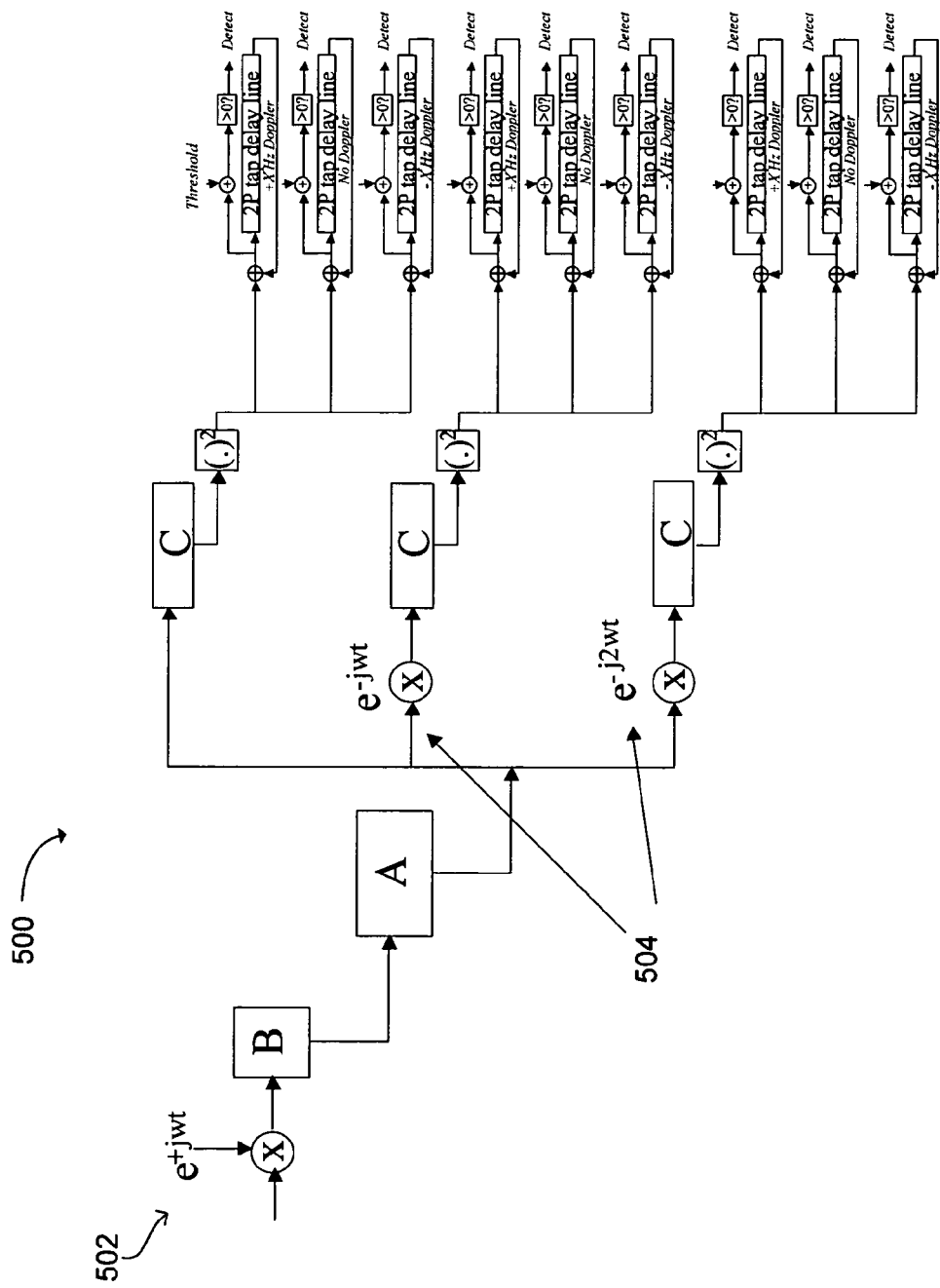
FIG. 5 is a block diagram showing one embodiment of a receiving node discover channel search engine configured to search three carrier frequency bins and three chip frequency bins in accordance with an embodiment of the invention.

FIG. 5 shows one embodiment of a hardware configuration for a receiving node discover channel search engine 500 configured to search three carrier frequency bins and three chip frequency bins. A phase rotator 502 operating at a frequency "ω" spins the complex input signal from the discovery channel. This is shown as a multiplication with $e^{j\omega t}$. The spun signal can then be despread by a matched filter for the B code, followed by another matched filter for the A code. At this point in the circuit, the AB code is despread and over the length of the AB code, the carrier rotation is relatively small (typically less than 60 degrees). The AB matched filter outputs are then back-spun by various amounts for each carrier frequency bin. The outputs of the matched filter for the C code are essentially despread outputs of an ABC composite code matched filter. The outputs can be squared to obtain energy estimates and feed these energies into a bank of three tap delay lines for each carrier frequency bin. In each carrier frequency bin, the top 2P tap delay line accumulates the ABC energy for the highest chip frequency and the bottom 2P tap delay line accumulates the ABC energy for the lowest chip frequency.

In the case of a chip frequency offset, the autocorrelation peak of the arriving burst can drift over the dwell time and accumulate the energy of the ABC matched filter output. In one embodiment, the chip frequency bin search can be performed by "slipping" the chip phase to the right or left in time by one sample every N symbols. If N is a small number, then the tap delay line is fed with samples that drift quickly to the right or left in time. If N is a large number, then the chip frequency correspondingly searched is small. A more complete description can be referenced in copending application entitled "Correlation Apparatus and Method for Accommodating Spreading Code Frequency Offset", application Ser. No. 11/351,465, which is herein incorporated by reference.

The hardware configuration embodiment shown in FIG. 5 represents a solution if every chip frequency bin must be searched for every carrier frequency bin, as illustrated by the uncertainty cube of FIG. 3. In contrast, if the chip and carrier clocks are tied together and the search is limited to the uncertainty surface of FIG. 4, then the hardware embodiment shown in FIG. 5 can be reduced to that shown in FIG. 6.

Figure 6A:
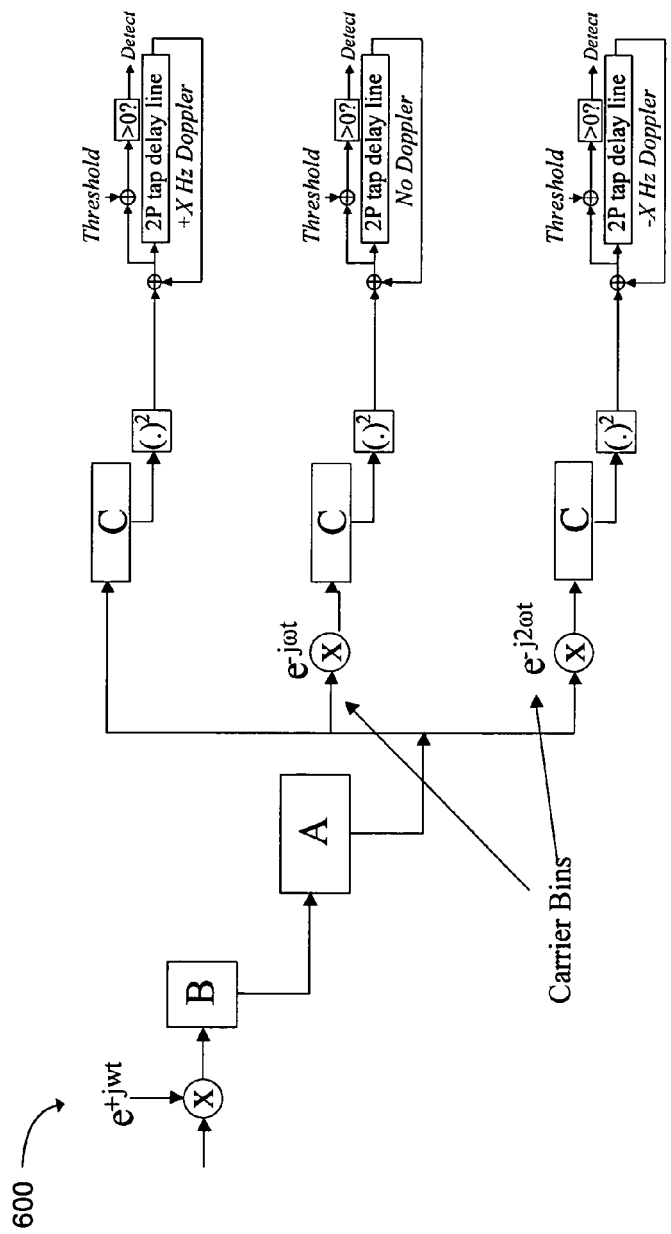
FIG. 6a is an illustration of a receiving node discover channel search engine configured to operate in a system when the clocks are tied together in accordance with an embodiment of the present invention.

FIG. 6a illustrates a less complex embodiment of a hardware configuration for a receiving node discover channel search engine 600 configured to operate in a system when the clocks are tied. In the simplified search engine, only the highest chip frequency in the highest carrier frequency bin needs to be searched. Similarly, only the lowest chip frequency in the lowest carrier frequency bins needs to be searched.

For the case of nodes moving at rates of ±1852 km/hr and having imperfect 0.05 ppm clocks, the Doppler shift will be about 21.2 kHz at a 12 GHz carrier frequency. This can be searched with 85 bins, while insuring that the carrier does not drift by more than ¼ cycle during the AB length component code.

Accumulated Cross-Product (ACP) Search Engine Architecture

The Accumulated Cross-Product Search Engine architecture represents an improvement over the PNCA Bin Search Engine. The ACP Search Engine is a more sophisticated search engine architecture that has a lower complexity than the brute force PNCA Bin Search Engine, while still achieving a substantially similar performance level.

Figure 6B:
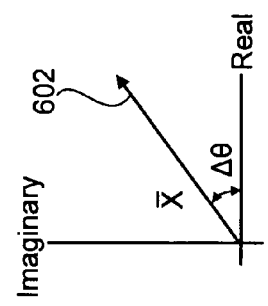
FIG. 6b is an illustration of a detected signal having a magnitude X and an angle AO.

In a conventional matched filter, once each sub-sample is multiplied by its respective PN code, it is typically summed with the other sub-samples over that symbol period. The symbol's magnitude is then calculated and summed with other symbols (over some dwell time) to get a PNCA value for the received signal. If the signals timing is not known, the PNCA is completed for all possible slip states to identify the correlation peak, and thus identify the proper timing. The difficulty comes when there is a large frequency offset present on the incoming signal. The frequency offset can occur due to a difference between the center frequency of the incoming signal and a reference frequency at the receiver. Ideally, the two frequencies would be substantially identical. However, as previously discussed, there can be discrepancies between the reference frequency and the center frequency of the incoming signal, due to imperfect clocks in the transmitter and receiver or a Doppler shift between the transmitter and receiver. The discrepancies can result in a difference in frequencies between the received signal and the receiver frequency reference. The frequency offset of the incoming signal 602 relative to the receiver frequency reference can be seen as a relative rotation when viewed in a Cartesian coordinate polar plot format, as shown in FIG. 6b. The input signal can be processed in a complex format. Real signals may be converted to a complex format using techniques such as complex sampling, quadrature down conversion, Hilbert transforms, and the like.

A rotation about the plot is equal to 360 degrees, or one cycle of a signal. Since the number of cycles between the input signal and the clock are offset by a set amount, the clock and the signal will rotate at different frequencies, or rates. The difference in frequency, $\Delta O$, is also referred to as a beat note. The beat note is a rate of change in phase angle when comparing the two signals in real time. When the signals are sampled, however, the change in phase angle, or beat note, can be a set amount per sample period. If the beat note is of sufficient size, the rotations between samples can smear or invalidate the PNCA making the correlation peak impossible to find.

One conventional approach for solving this problem is a frequency bin search. A frequency bin search is completed by dividing the frequency uncertainty range into bins of sufficiently small frequency ranges to allow a valid PNCA to be completed for each bin, as previously discussed. As shown in FIGS. 3 and 4, millions of different bins may need to be searched for a spread spectrum burst having a relatively large processing gain and a fairly high degree of Doppler shift.

Figure 7A:
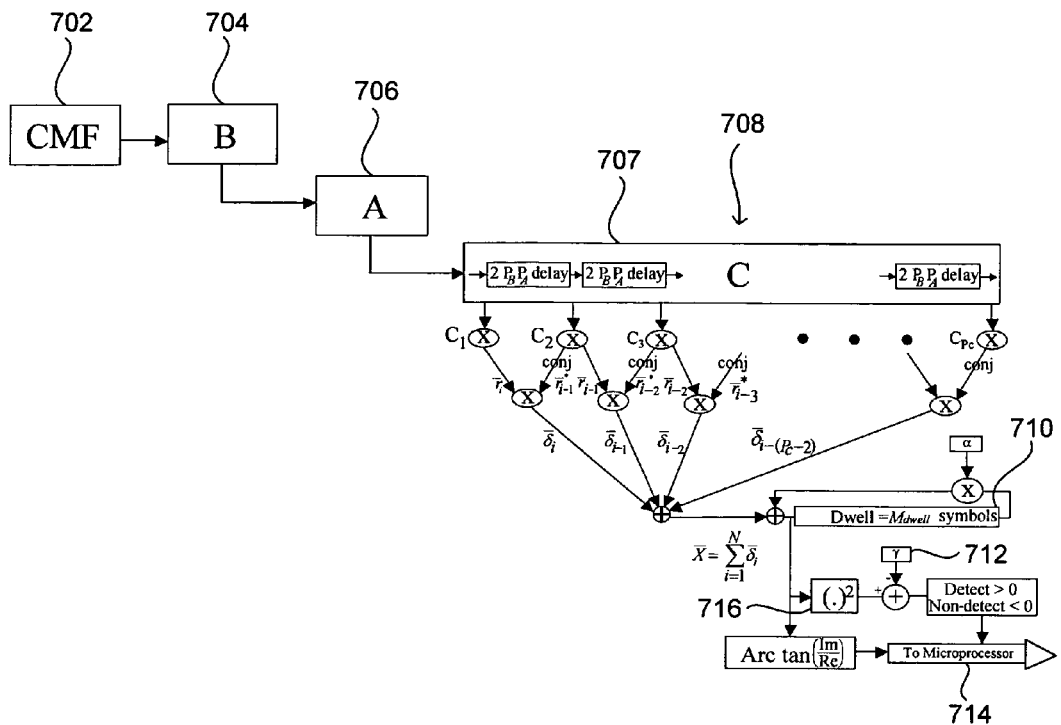
FIG. 7a is an illustration of one embodiment of an ACP coarse frequency and presence detector search engine used in conjunction with a composite matched filter in accordance with the present invention.

FIG. 7a illustrates one embodiment of an ACP coarse frequency and presence detector in conjunction with a composite matched filter. The detector provides an efficient system for rapidly detecting the presence of a burst along with its beat note or frequency offset. The detector is useful in detecting a spread spectrum burst signal wherein the signal has a relatively large processing gain and a potentially high degree of Doppler shift. The presence and frequency offset information can then be fed to a microprocessor enabling further analysis of the signal, as disclosed in the copending application entitled "System and Method for Fine Frequency Measurement in a Spread Spectrum Signal", application Ser. No. 11/540,136, which is herein incorporated by reference.

In one embodiment, the ACP coarse frequency and presence detector can despread the first two layers of a composite code using the chip matched filter (CMF) 702, the B code despreader 704, and the A code despreader 706. The length of the A code, B code, and C code is represented by $P_A$, $P_B$, and $P_C$. The length of the composite code $P=P_A*P_B*P_C$, as previously discussed. The chip matched filter can sample the incoming spread spectrum data at a desired sampling rate, such as at the chip rate, twice the chip rate, or whatever sampling rate is needed to recover the signal. The chip matched filter is typically a shaped filter matched to the sampled waveform.

The B code despreader 704 includes $2P_A$ delays and $P_B$ taps. The A code despreader 706 includes 2 delay and $P_A$ taps. The C code delay device 707 includes $2P_AP_B$ delays and $P_C$ taps. It should be noted that the C code is not actually despread. Rather, the accumulated cross product of the C code spread data is determined, as discussed more fully below.

One substantial difference between this detector and the conventional PNCA-based detector, as shown in FIG. 5, is the final stage 708. In the final stage, instead of summing the despread sub-samples directly, as in a conventional matched filter, each sub-sample is multiplied by the conjugate of the proximate symbol. The sub-sample represents the C code chips, which are present within the ABC code every $2P_BP_A$ chips. Thus, a $2P_BP_A$ delay is used in the C code delay device. The proximate symbol can be either the preceding symbol or the following symbol, as long as either the preceding or following symbol is used throughout the entire engine. The multiplication retains the magnitude and angle (beat note) information of the sub-sample pairs, as shown in the following equations:

$$\delta_i = r_i e^{j\theta i} \cdot (r_{i-1} e^{j\theta i-1})^*$$

$$\delta_i = |r_i r_{i-1}| \cdot (e^{j\theta i - j\theta i-1})$$

where $r_i e^{j\theta i}$ represents a signal sample vector (or data vector) over the sample period having a magnitude of $r_i$ and an angle $\theta$.

Once the conjugate multiplication ($\delta_i$) has been calculated for all sub-sample pairs, they are summed over the dwell period. The symbol vectors are summed over the dwell period as shown in the equation below:

$$\overline{X} = \sum_{i=1}^{N} \overline{\delta}_i$$

where N is equal to $N_{symbols}*(Pc-1)$, where $P_c$ is the length of the C code. In one embodiment, the total dwell period 710 can be equal to twice the length of the PN code P when the sample rate is at twice the chip frequency. Obviously, the length of the dwell period is dependent on the sample rate. A feedback loop allows the samples of a first symbol to be synchronously added to the samples of additional symbols. The number symbols for which the dwell time is added can be dependent on signal to noise ration and other correlation factors as can be appreciated. A variable γ 712 represents the minimum burst magnitude that is determined to represent a burst detection. In other words, γ is the predetermined detection value. When a burst is detected then the magnitude can be sent to the microprocessor 714. Correlation between the incoming signal and a reference clock in the receiver can be based, at least in part, on the location of the sub-sample entering the dwell period when the burst magnitude becomes greater than γ.

It should be noted that all of these calculations have retained the angle and magnitude vector information. Multiplying $\overline{X}$ by its conjugate yields the approximate magnitude of the vector, as shown in FIG. 7a by the $(.)^2$ symbol 716. The magnitude of the detection statistic, $\overline{X}$, indicates the presence or absence of a burst and the magnitude value can be used as the Accumulated Cross Product energy value for that slip time. The beat note for that slip time is calculated from the Arctangent of $\overline{X}$ as shown in the equation below.

$$\text{Beat Note} = \text{Arc} \tan(imag(\overline{X})/\text{real}(\overline{X})) \cdot \left(\frac{P_c \cdot R_S}{2\pi}\right)$$

Where Pc is the length of the C code and $R_S$ is the symbol rate, or number of symbols per second. With the magnitude and beat note known, the receiver can reconstitute the data for the received signal.

When using a standard PNCA squaring or absolute value detector, the rotation angle from one symbol to the next should be held to less than ±90 degrees. This is desirable because in a standard PNCA correlator, as shown in FIG. 5, the rotation information is lost due to the squaring or absolute value. With rotation greater than ±90 degrees per symbol the PNCA peak is distorted or lost.

In the equation above, however, the arctangent is valid for rotations of up to ±180 degrees per sub-symbol. Assuming that the C code was of length 30, the theoretical beat note tolerance increase over a standard PNCA correlator is (180 deg/90 deg)*30 sub-symbols=60 times. This can be interpreted as a 60:1 reduction in the number of frequency bin searches required. Thus, the use of the ACP search engine architecture provides a significant advantage over the standard PNCA correlator.

Figure 7B:
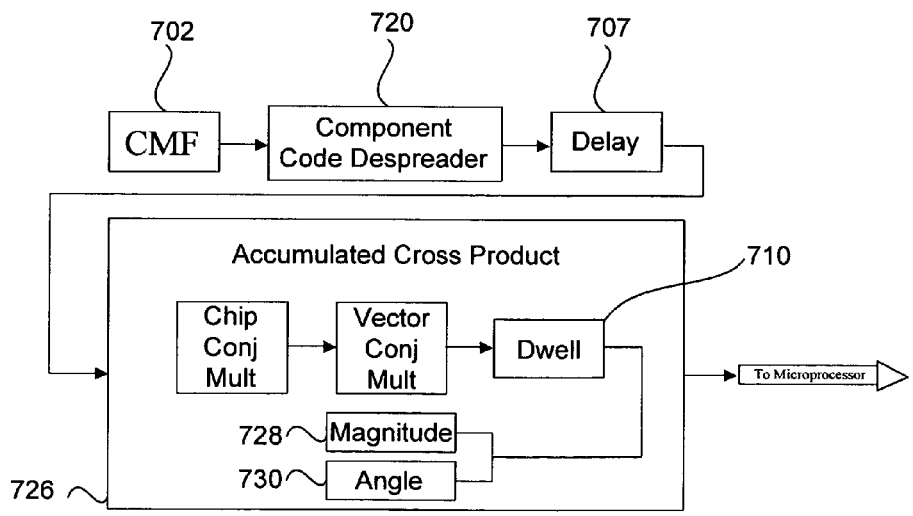
FIG. 7b is a block diagram of the ACP coarse frequency and presence detector search engine of FIG. 7a in accordance with an embodiment of the present invention.

FIG. 7b shows a more generalized version of the ACP coarse frequency and presence detector. The chip matched filter 702 can filter the incoming waveform as previously discussed. A composite code having N+1 layers (wherein N is a positive integer) can be sampled at a predetermined rate, such as twice the chip rate, and sent to the Component Code Despreader 720. The Component Code Despreader is configured to despread one or more of the N+1 components of the composite code. In one embodiment, the Component Code Despreader can be used to despread N components of the composite code. The N+1 spread code is then sent to the tap delay line 707, which outputs a chip of the N+1 spread code at a rate that is dependent on the sampling rate. For example, if the sampling rate is at twice the chip rate, then the delay outputs a proximate chip every $2P_A*P_B \ldots *P_N$ chips, where $P_N$ is the length of the N+1 code. The output of the delay is then sent to the Accumulated Cross Product determinant 726. Alternatively, a certain number of the N layers may be despread until the signal to noise ratio of the data signal is less than a predetermined level. The partially despread data signal can then be sent to the ACP determinant. This will be discussed more fully below.

Chip conjugate multiplication 709 performed on proximate chips (or taps) over the selected sample time is also conjugate multiplied with the proximate vector 711. The data vector represents the data received for each sample time. Ideally, the data has the same or a substantially similar angle for each chip and sums to represent a symbol. However, noise can cause changes in the angle of each data vector over the sample time. By determining the beat note over a dwell time, it can be determined at what angle the data vector is being received. This enables the beat note to be removed, allowing the data to be more easily extracted from the spread signal.

After the conjugate multiplication is performed on the chips and data vectors the output is summed for a predetermined dwell period in a dwell line 710 to form an accumulated cross product (ACP) signal, or data vector having a magnitude and angle. A burst detector 728 is configured to receive the ACP signal vector and determine whether its magnitude is greater than a predetermined amount. If the ACP signal vector magnitude is greater than a predetermined value then the magnitude of the ACP vector is output to a microprocessor for further analysis. Similarly, a signal vector angle detector 730 is configured to determine an angle of the ACP vector and output the angle value when the magnitude of the ACP vector is greater than a predetermined amount.

While FIGS. 7a and 7b disclose the use of a composite code, it should be noted that other types of spreading and despreading may be used in conjunction with the accumulated cross product. However, multiplying the chips by their conjugate effectively squares the amount of noise over the sample period. For example, a data vector having a signal to noise ratio (SNR) of −10 dB that is multiplied by another data vector with a −10 dB SNR results in a signal having about −20 dB SNR. Thus, if a spread signal having an SNR of −35 dB is received, the conjugate multiplication of the spread signal results in signal with an SNR of −70 dB. The desired speed and sensitivity of the hardware effectively limits the level of the SNR that is acceptable in the data vectors.

By using a composite code, substantially all of the benefits of a large processing gain can be achieved while still being able to use the ACP search engine to determine a presence and beat note of the incoming burst signal. For example, the spread signal with an SNR of −35 dB can be partially despread. Despreading the AB code can result in a signal with a −10 dB SNR, which can result in a signal having an acceptable −20 dB SNR after the conjugate multiplication. So the use of a composite code provides a significant advantage over a typical single layer spread spectrum code.

Successive taps for the C code in the final stage of the composite filter shown in FIG. 7a can be calculated according to the following equations for i=1 to 3, where the data vector is represented by $\bar{r}_i$ and the spread code is $C_i$:

$$\text{tap } 1 = \bar{r}_1 C_1 \cdot (\bar{r}_2 C_2)^*$$

$$\text{tap } 2 = \bar{r}_2 C_2 \cdot (\bar{r}_3 C_3)^*$$

$$\text{tap } 3 = \bar{r}_3 C_3 \cdot (\bar{r}_4 C_4)^*$$

A more generic form of the above equations can be written as:

$$\text{tap } i = (C_i C_{i+1}^*) \cdot (\bar{r}_i \bar{r}_{i-1})$$

As previously stated, the conjugate can be performed on the proximate tap or data vector (preceding or following). Thus, the generic equation can also be written as:

$$\text{tap } i = (C_i C_{i-1}^*) \cdot (\bar{r}_i \bar{r}_{i-1})$$

so long as one of the preceding or following tap and data vector is used consistently throughout the ACP search engine architecture.

In the generic form, it is evident that every term of $\bar{r}_i$ is multiplied only by the conjugate of the proximate vector. It is also evident that the multiplication of the two vectors and the multiplication of the two PN codes can be independent. The independence provides a substantial benefit to this embodiment of the present invention. The independence enables the multiplication of the $\bar{r}_i$ vectors to be performed before the multiplication by the PN codes.

Figure 8A:
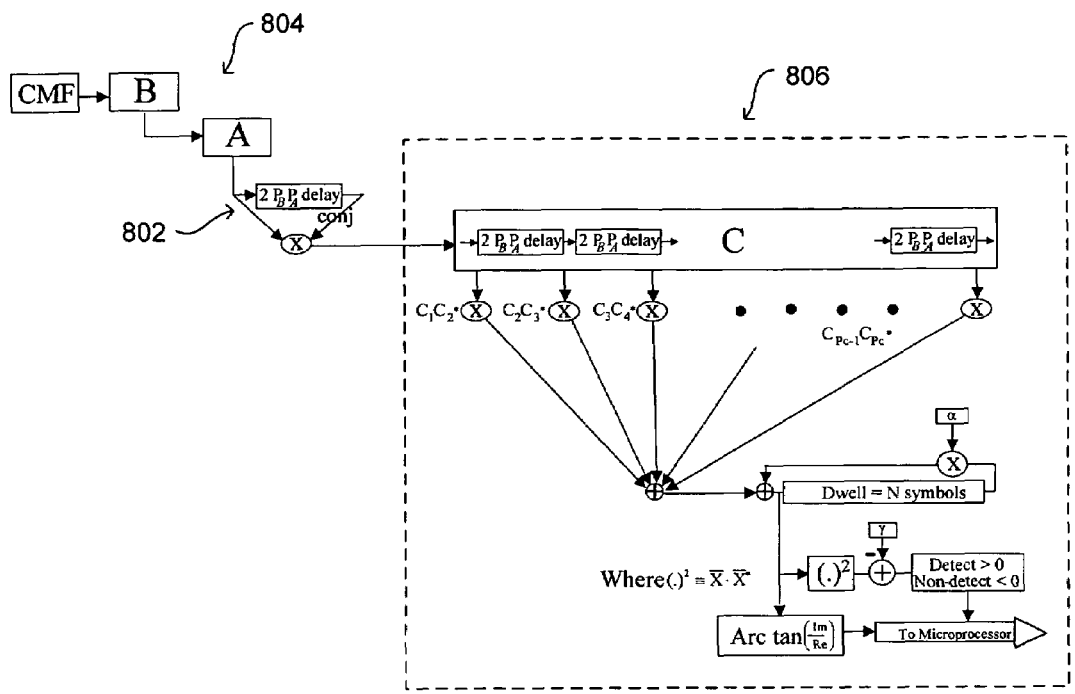
FIG. 8a is an illustration of a less complex ACP coarse frequency and presence detector search engine used in conjunction with a composite matched filter in accordance with the present invention.

FIG. 8a shows a block diagram of one embodiment of an ACP search engine architecture that takes advantage of rearranging the multiplication. This implementation has a lower complexity than that of FIG. 7a, since the conjugate multiplication of the data vector 811 is performed on the outputs of the AB code despreader 804, rather than being done $P_c$ times, as shown in FIG. 7a. Performing the multiplication on the outputs of the AB code despreader effectively reduces the number of multiplies that have to be performed by a ratio of $P_c$−1 to one.

Figure 8B:
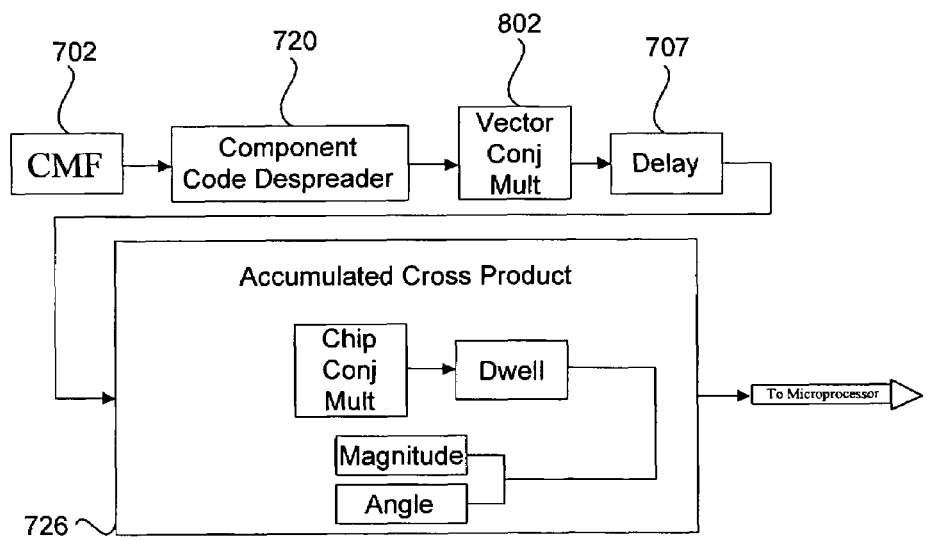
FIG. 8b is a block diagram of the ACP coarse frequency and presence detector search engine of FIG. 8a in accordance with an embodiment of the present invention.

FIG. 8b shows the block diagram of FIG. 7b with the vector conjugate multiplication 811 performed outside the accumulated cross product determinant 726, resulting in a reduction of the number of multiplications by the ratio of $P_{N+1}$−1 for a composite code having N+1 components. The ability to perform the vector conjugate multiplication outside the ACP determinant provides a significant advantage by decreasing the complexity of the circuit.

The amount of frequency uncertainty tolerated by a single ACP coarse frequency and presence detector is dependent upon the length of the PN code for the detector layer. The PN code for the detector layer is the component code or codes at the input of the tap delay line 707 (FIGS. 7a, 7b, and 8b). The PN code length for the detector layer does have some restrictions. As the detector layer's PN code is lengthened, the signal to noise ratio of the sub-symbols decreases and the dwell time is typically increased to overcome increase in signal to noise ratio. Very large frequency uncertainties would use PN lengths and dwell times so large as to be unsuitable to meet requirements of a typical system. At this point a new or different technique can be used to improve performance.

Figure 9:
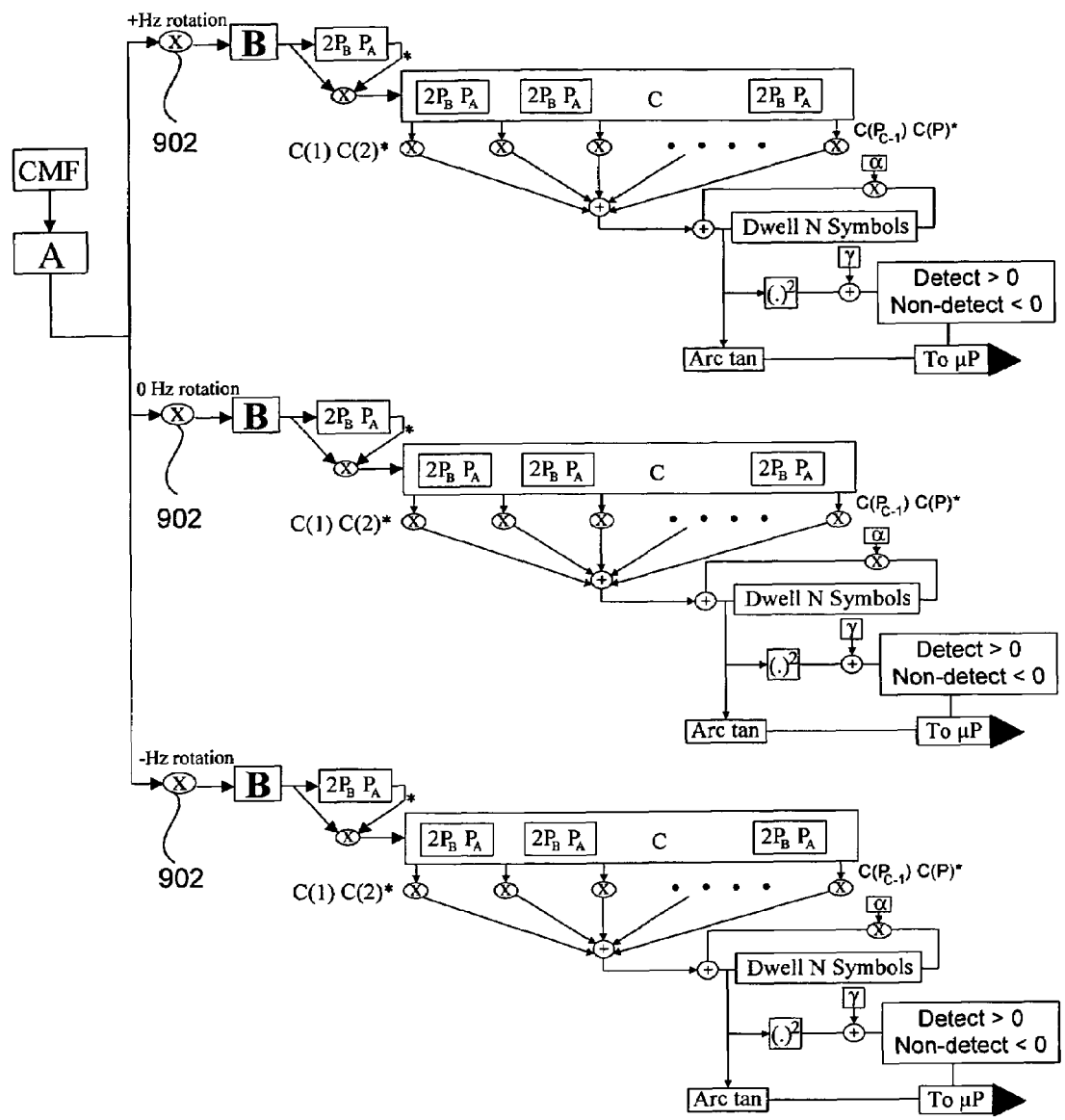
FIG. 9 illustrates an embodiment of the invention wherein multiple ACP coarse frequency and presence detector engines can be used, where the detector layer PN code of each engine is rotated at a different frequency to create ACP coarse frequency and presence detector frequency bins in accordance with an embodiment of the present invention.

In one embodiment, multiple ACP coarse frequency and presence detector engines can be used, where the detector layer PN code of each engine is rotated 902 at a different frequency to create ACP coarse frequency and presence detector frequency bins, as shown in FIG. 9. In this example embodiment three frequency bin searches are shown. It should be noted that the rotation is completed in this example prior to de-spreading the B code of the ABC composite code. Rotating for bin separation prior to the B code despreading can increase the number of sub-samples, thus reducing the sub-sample time interval before rotation. The frequency capture range of a bin, $F_R$, can be calculated according to the following equation:

$$\frac{\left(\frac{R_C}{P_B \cdot P_A}\right) \Delta\theta}{360} = F_R = \frac{(P_C \cdot R_S) \Delta\theta}{360}$$

Wherein $R_C$ is the chip rate and $R_S$ is the symbol rate. For example, if the code lengths were $P_A$=11, $P_B$=31, and $P_C$=31 the total PN length would be 10,571 chips. If the chip rate was 10 Mcps, the capture range of a single ACP coarse frequency and presence detector is ±7.33 kHz for a 90 degree rotation ($\Delta\theta$) allowed between C code sub-samples.

The capture range is calculated in one direction, meaning that the full range is ± that amount for a total range of $2F_R$. The total frequency capture range for the ACP coarse frequency and presence detector bin searcher with three bins then becomes $3(2F_R)$ or 43.99 kHz for a 90-degree sub-sample rotation rate. For a conventional PNCA design with bins set at ¼ symbol rotation rate it would typically require $P_c$ bins to detect a signal over the same frequency capture range. Thus, the present invention can reduce the amount of required hardware by orders of magnitude.

As previously discussed, the use of the ACP detector permits more than a 90-degree rotation per partial symbol, or every $1/R_s P_C$ seconds. If the rotation approaches 180-degrees per partial symbol, then the ACP search engine may provide a biased frequency estimate because any samples having a rotation greater than 180-degrees due to noise will be interpreted as a large negative rotation. This biases the accumulated result and causes the beat note estimate provided by the coarse search engine to be low. A rotation buffer may provide an optimal solution, allowing a greater rotation and thus a larger frequency capture range, while substantially eliminating the large negative rotation caused by noise. For example, the rotation may safely be expanded from 90 degrees to 120 degrees while still minimizing negative rotations caused by noise. The rotation buffer between 121 degrees and 180 degrees can be used to guard against overshoots due to noise. The total frequency capture range for the ACP coarse frequency and presence detector bin searcher with three bins then becomes $3(2F_R)$ or 58.65 kHz for a 120-degree sub-sample rotation rate, a significant improvement over the 90-degree sub-sample rotation rate.

The ACP coarse frequency and presence detector bin searcher shown in FIG. 9 provides the ability to quickly discover a signal with very large frequency uncertainties due to Doppler effects. The bin searcher enables multiple bins to be searched while offering substantial reductions in the hardware and time required to search over a typical PNCA search engine, thereby yielding a search engine with parallel bin search capabilities having increased speed and much reduced complexity. This enables a relatively simple and less complex search engine that is capable of detecting a spread spectrum burst transmission having a relatively short preamble with an unknown start time, code phase, and code frequency.

Fine Frequency Measurement System

The fine frequency measurement system can be used to refine the frequency offset to enable one or more burst receivers to recover data transmitted on a channel. The fine frequency measurement system can receive the frequency offset estimate provided by the coarse frequency and presence detector described above and refine the frequency offset estimate to a value having less than one ¼ symbol rate of uncertainty. In one embodiment, the fine frequency measurement system can be used to identify fine frequency offsets of a received signal such as a burst transmission. The system can also be configured to identify simultaneous arrivals of active signals, channels, and users. Simultaneous arrival of signals can occur when signals are concurrently received on two or more channels. Two or more signals that arrive simultaneously can have overlapping symbols, especially when the data rate is relatively low, such as 1 kilobit per second. However, the signals can typically be distinguished at the chip sample rate due to the large spreading factor. A sample rate of twice the chip rate may be 20 mega-chips per second. Thus, two signals that arrive several microseconds apart appear to be simultaneous at the data rate, but can be distinguished at the sample rate. Simultaneous arrival can also appear to occur at a receiver when a falsely detected signal by the ACP coarse frequency and presence detector appears as a simultaneous user even in a system with no simultaneous users.

Figure 10:
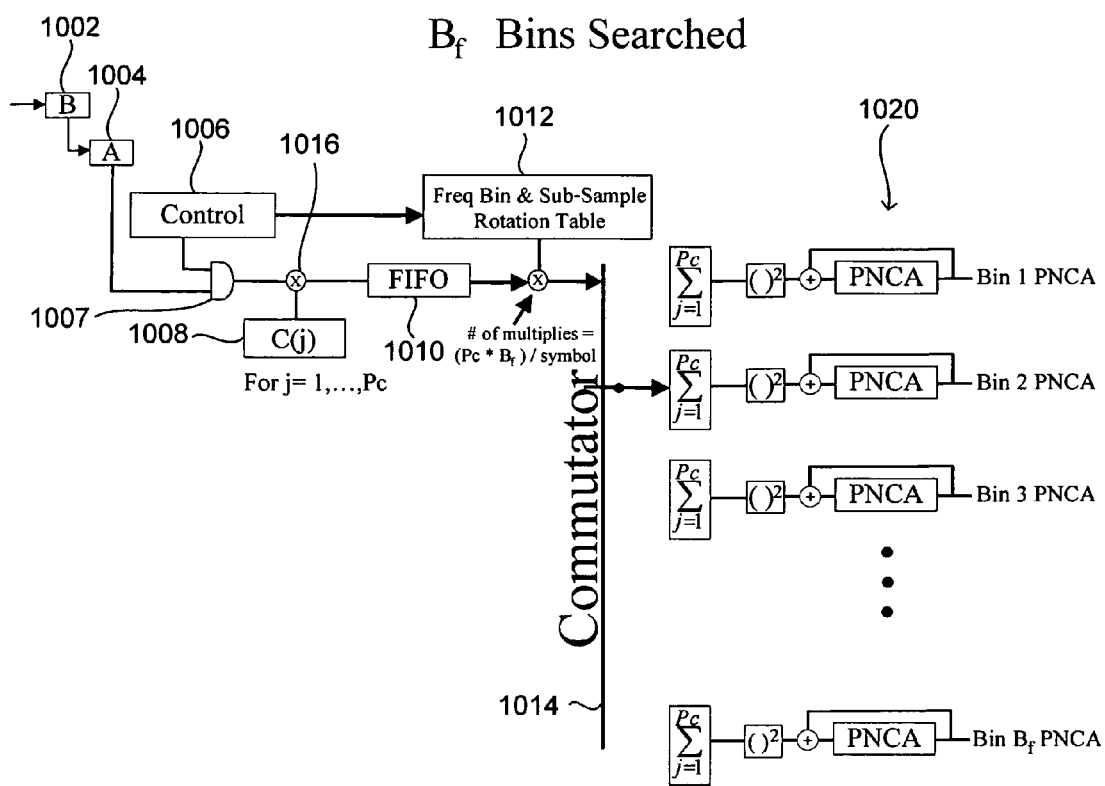
FIG. 10 is a block diagram illustrating a fine frequency measurement system in accordance with an embodiment of the present invention.

In one embodiment, a fine frequency measurement system can be implemented as shown in FIG. 10. This example embodiment includes a composite code comprising an ABC code. In this example, the B code component 1002 and the A code component 1004 can be despread using a despreader. For example, partial despreading can be done using a correlator, a finite impulse response filter, a surface acoustic wave device, a multiplier, a phase shifter, and the like. The component code can be real or complex. As can be appreciated, to despread a complex component, a quadrature multiplier, quadrature phase shifter, and the like can be used. While FIG. 10 shows the A code component 1004 and B code component 1002 being despread proximate to the control 1006, the components of a composite code can also be partially despread at an earlier point in the overall system. For example, the composite code can be partially despread in the Coarse Frequency and Presence Detector, as shown in FIGS. 7a-9. The partially despread signal from the Coarse Frequency and Presence Detector can be used as an input into the fine frequency measurement system without requiring that the A and B code components be removed a second time.

A microprocessor (not shown) can receive magnitude and angle information about the received signal from the Discovery Coarse Frequency and Presence Detector, as shown in FIGS. 7a-9. The microprocessor can use the magnitude information to determine a substantially on-time phase of the incoming signal. The on-time phase calculation can be used to set up the control 1006 function in the Discover Fine Searcher to enable substantially on-time sub-samples to be isolated for processing.

For example, if the composite code lengths are $P_A=11$, $P_B=31$ and $P_C=31$, the total composite code length of the ABC code is $P_A*P_B*P_C=10,571$ chips per symbol. If the spread signal is sampled at a rate of two samples per chip then there is a total of 21,142 sub-samples per symbol. After the A and B codes are despread out of the sub-sample stream, the resulting stream of 21,142 sub-samples is constituted of $P_c$ chips interleaved throughout the 21,141 sets of sub-samples at a length of $2P_A P_B$. The Coarse Frequency and Presence Detector, as shown in FIGS. 7a-9, can be used to substantially correlate the incoming signal such that the set of $P_c$ chips represent relatively on-time sub-samples. This is accomplished by noting the timing of the incoming signal relative to a clock reference in the receiver when a burst is detected by the Coarse Frequency and Presence Detector. Once the correlation information is loaded into the control function 1006 then the Discovery Fine Searcher can select the $P_C$ on-time sub-samples out of the total set of 21,142 sub-samples. This reduction in work can enable the Discovery Fine Searcher to use the same engine to perform multiple searches of multiple bins in parallel. FIG. 10 shows a single searcher for simplicity having multiple frequency bins 1020.

More specifically, the control 1006 can be used to select the appropriate 31 ($P_c$) on-time sub samples. In one embodiment, as shown in FIG. 10, this can be accomplished by coupling the control to an AND gate 1007. The control can enable the AND gate logic to be affected in such a way that it will allow the 31 on-time sub samples to be output out of the AND gate while blocking the other sub-samples. The 31 on-time sub samples, which represent the $P_c$ code at the approximate time a burst transmission was received, can be multiplied by the same C code 1008 to effectively remove the chips from the signal.

The ACP coarse frequency and presence detector also provides an average angle of the data vector. The angle represents a rate at which the data vector is rotating relative to a frequency reference in the receiver. The Frequency Bin and Sub-Sample Rotation Table 1012 can receive the average angle of the data vector from the coarse frequency and presence detector. Each sample in the signal can then be de-rotated 1016 by that amount. However, the accuracy of the coarse frequency and presence detector may not be sufficient to determine the exact amount of rotation on the incoming signal. Despite de-rotating the signal samples, there may still be some rotation on the signal due to errors between the transmitter and receiver clocks, clock imperfections, Doppler effects, and so forth.

To further determine a substantially correct start time, chip frequency, and chip phase of the incoming signal a commutator 1014 can then be used to rotate the signal into a plurality of pseudonoise correlation accumulation (PNCA) bins 1020. Each bin can represent a different rotation hypothesis for the fine frequency measurement system. The bin having the greatest power output can represent the best approximation of the frequency offset for the incoming signal. A total number of $B_f$ bins can be searched. The total number of bins is determined by the desired accuracy, cost, and level of hardware complexity.

Figure 11:
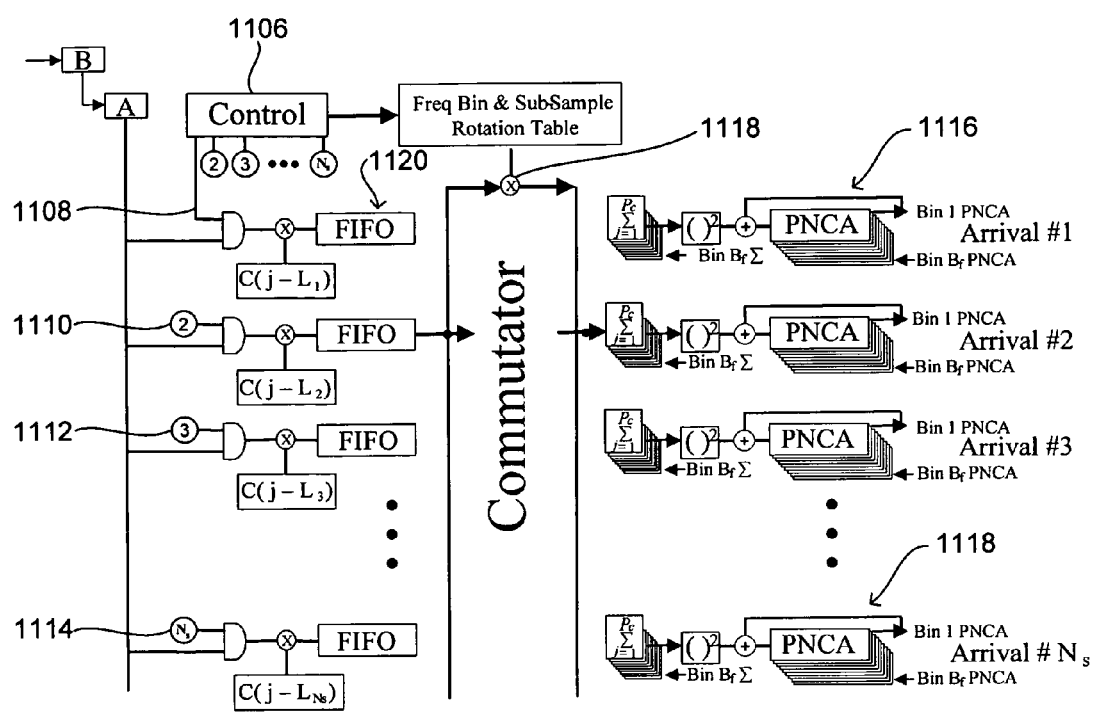
FIG. 11 is a block diagram of a fine frequency measurement system enabled to receive a plurality of signals that arrive at substantially the same time in accordance with an embodiment of the present invention.

In FIG. 11, the fine frequency measurement system of FIG. 10 is shown with the inclusion of the ability to receive a plurality of signals that arrive at substantially the same time. A signal is determined to arrive at substantially the same time if a second signal arrives while the first signal is still being processed. The fine frequency measurement engine of FIG. 11 shows a parallel engine configured to receive $N_s$ simultaneous arriving signals, despread two components of the composite pseudonoise code, de-rotate the signals according to the information received from the coarse frequency and presence detector, and determine the PNCA for each of the de-rotated signals in $B_f$ different frequency bins, as previously discussed.

The incoming composite spread spectrum signal can have its B code component and A code component removed. As previously discussed, the composite spread spectrum signal is not limited to a two or three component code, but can include as many components or layers as desired. The C code spread signals, in this example, can then be sent to a first 1108, second 1110, third 1112, and so forth, to the $N_s$ 1114 C code multiplier. The C code multiplier can have a delay 1120 implemented to account for a delay between the substantially simultaneously received signals. The delay is represented by $C(j-L_1) \ldots C(j-L_{Ns})$, where $L_1, \ldots L_{Ns}$ is the lag time between the signals. The delay can also be used to provide a buffer for any bottlenecks in the overall system when substantially simultaneous signals are received. The delay can be a "First In First Out" type delay comprised of a buffer, or any other type of delay configured to enable the fine frequency measurement system to receive a plurality of substantially simultaneous signals.

The substantially simultaneously received signals can be de-rotated according to the coarse frequency and presence detector vector angle for each signal and each signal can be rotated to $B_f$ different PNCA bins based on their arrival time. For example, in one embodiment, a first arrived signal can be sent to the first set of $B_f$ PNCA bins 1116 and so forth until the $N_s$ arrived signal is sent to the $N_s$ set of $B_f$ PNCA bins 1118. For each of the $N_s$ signals, the $B_f$ bin having the greatest power output can represent the best approximation of the frequency offset for the incoming signal. A total of $(P_c * B_f * N_s)$ complex multiplications are performed per symbol to enable the $B_f$ PNCA bins to be filled for $N_s$ simultaneous arrivals each having $P_c$ chips. However, this number represents a substantial improvement over performing calculations for the entire signal which has $2*P_A*P_{B*PC}$ sub-samples at a half-chip sample rate.

Figure 12:
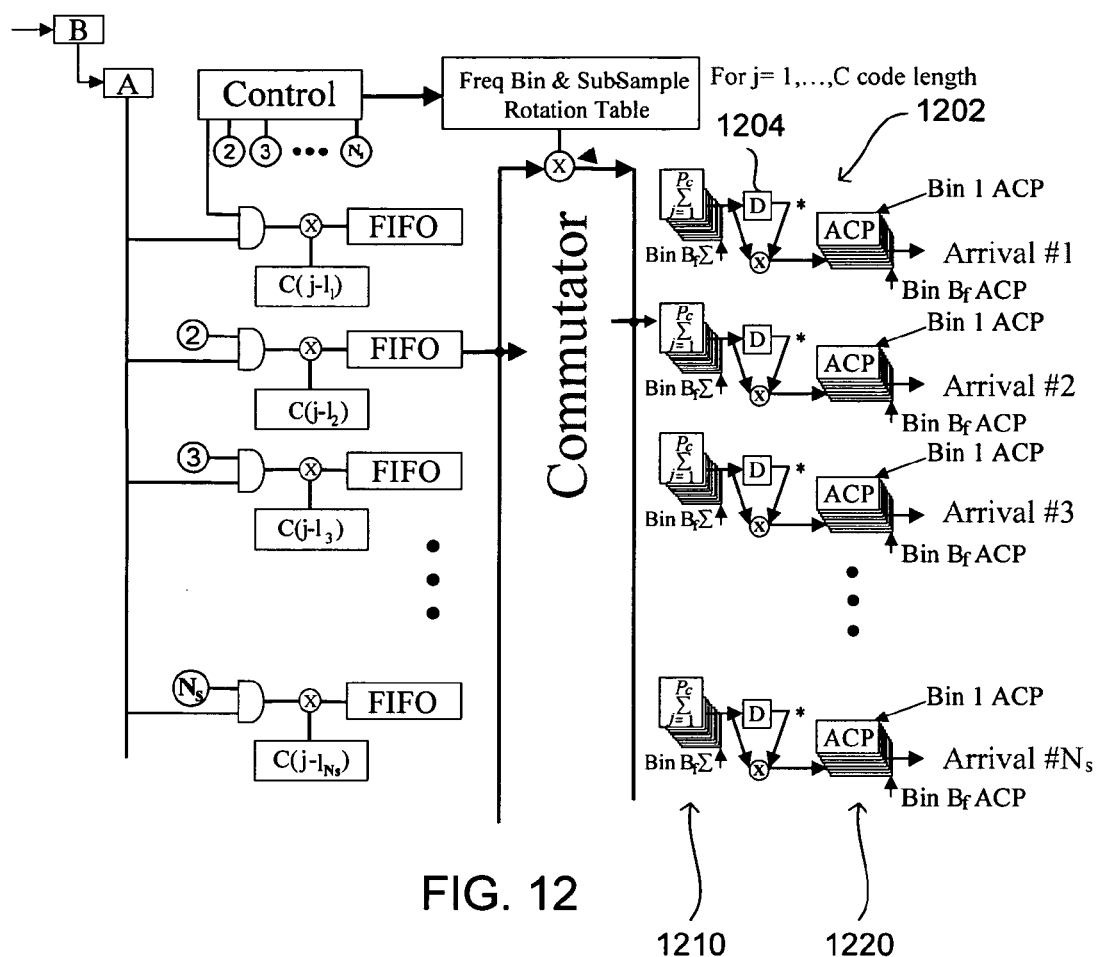
FIG. 12 is a block diagram illustrating a fine frequency measurement system enabled to receive a plurality of substantially simultaneous signals and having a plurality of accumulated cross product bins in accordance with an embodiment of the present invention.

FIG. 12 shows the fine frequency measurement system with simultaneous arrivals of FIG. 11 with an improved technique for determining the fine frequency offset of the incoming signal(s). Instead of using a PNCA bin for each of the $B_f$ hypotheses to determine which bin has a signal having the greatest magnitude, an Accumulated Cross Product (ACP) bin 1202 can be used instead. As in FIG. 11, there can be $B_f$ ACP bins for each of $N_s$ simultaneous arrivals. Each ACP bin can operate as shown in either FIGS. 7a-8b. Each data vector can be multiplied by the complex conjugate of a proximate data vector. A delay 1204 can be used to implement the multiplication of the proximate data vectors. As in FIG. 8, this multiplication can be done prior to a tap delay line and summation section 806 (FIG. 8), thus reducing the number of complex multiplies performed.

Using the ACP bins 1202 in place of the PNCA bins 1116 not only reduces the number of operations, but also provides additional information in the form of the magnitude and frequency offset (beat note) component of the data vector, as previously discussed. Once the ACP for an arrival over the various $B_f$ frequency bins has been completed for each of the $N_s$ substantially simultaneously arrived signals, the bin with the largest magnitude can be used to calculate the frequency offset of the received signal from the angle information. A microprocessor can then assign that signal to a receiver, sending the receiver a substantially correct phase (correlation peak) and fine frequency offset of the signal to facilitate rapid synchronization of the receiver to the signal.

The fine frequency measurement system for simultaneous arrival, as shown in FIG. 12, enables the measurement of frequency offsets in preambles having all ones data in the preamble. However, a preamble comprised entirely of ones provides a non-pseudorandom signal that can increase the probability of detection. For a customer desiring substantially low probability of detection (LPD), it is desirable to have a preamble that is not comprised entirely of ones. Rather, a preamble comprised of scrambled data having a substantially pseudorandom pattern can significantly reduce the probability of detection. However, the presence of scrambled data in the preamble causes mathematical problems within the fine frequency measurement system.

Specifically, summations 1210 prior to the multiplication of the complex conjugate of proximate data vectors are sums over a symbol length. In the presence of data, the following conjugate multiplications cannot be properly summed after 1220 the conjugate multiplication. This is because the data's presence leaves the vectors non-aligned.

However, if the scrambled data in the preamble is viewed as another component in a composite code, such as a "D" component of a PN code, then it could be removed by despreading with an appropriate filter. This is possible because there is typically no requirement to retain the data in the preamble since its only purpose is to provide a low probability of detection during transmission. Once the data is received, the preamble no longer needs to be scrambled.

Figure 13:
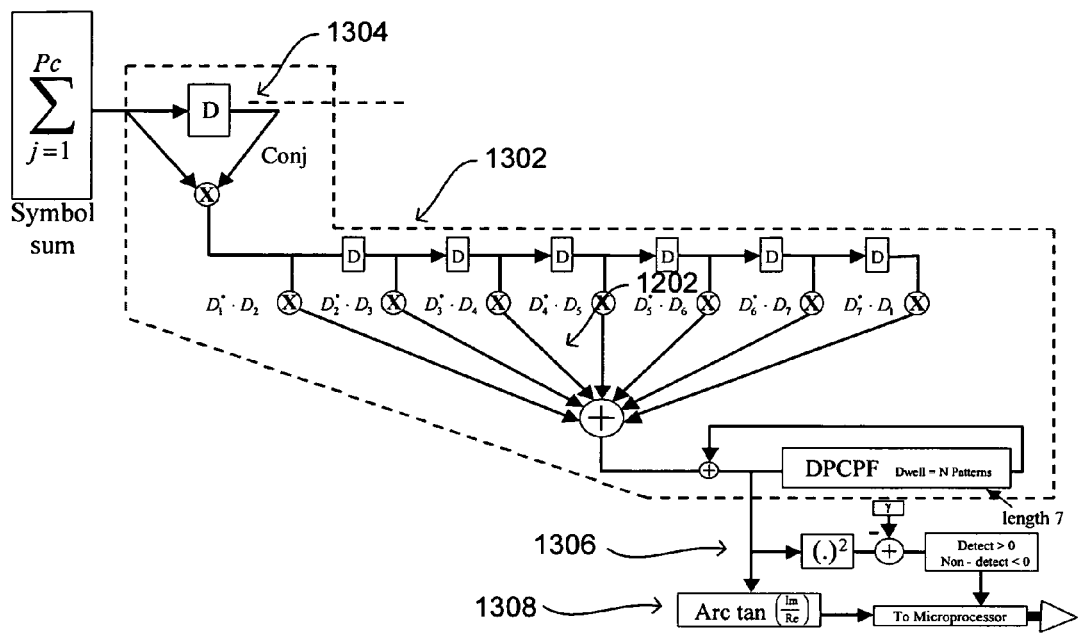
FIG. 13 is a block diagram illustrating a Data Pattern Cross Product Filter in accordance with an embodiment of the present invention.

FIG. 13 shows one example embodiment of a Data Pattern Cross Product Filter 1302. The embodiment shown contains a length 7 Barker code used to scramble the preamble. However, other types of scrambling codes having an appropriate length and pattern may be used. In this embodiment, a complex conjugate multiplication of the data vectors 1304 is accomplished. Next, filter taps are multiplied by the conjugate of the present data times the preceding data over the entire data pattern. These cross products in the filter taps are derived to cancel the cross product data information in the vector. Once the data information is cancelled the vectors may be summed. Since the proper position of the data has not been determined, all possible slips are calculated. The vector sum having the proper position will then be the largest. The largest vector can be determined with a simple magnitude calculation 1306, as previously discussed. The angle, or frequency offset of the data vector, can then be determined by calculating the arctangent 1308, as discussed above.

The Data Pattern Cross Product Filter 1302 filter provides two substantial improvements over a standard filter. First, the complex conjugate multiplication enables frequency information of the data vectors to be retained. Secondly, the conjugate multiplication of the proximate filter taps enable removal of the data information. This enables the scrambling to be effectively removed from the preamble, allowing the data pattern cross product filter to be implemented into the fine frequency measurement system for simultaneous arrival to allow the vectors to be aligned and added while providing a low probability of detection of the preamble burst.

Figure 14:
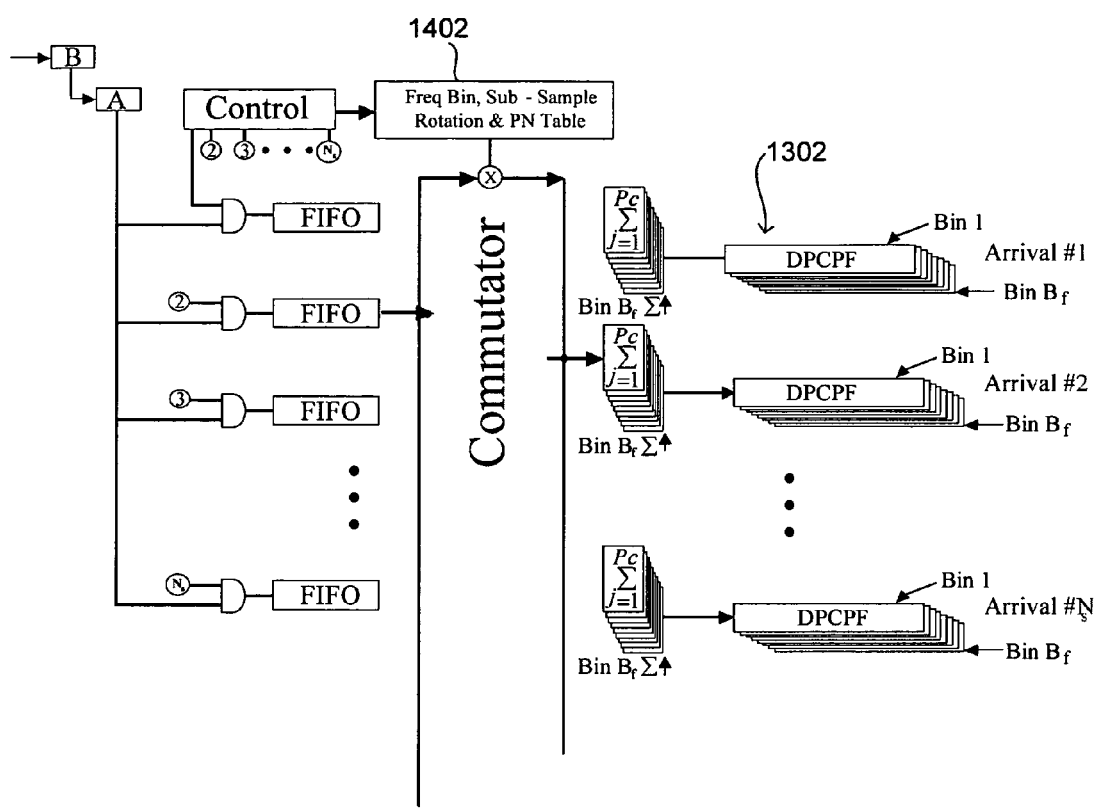
FIG. 14 is a block diagram of a fine frequency measurement system for simultaneous arrival with an incorporated data pattern cross product filter in accordance with an embodiment of the present invention.

A fine frequency measurement system for simultaneous arrival with an incorporated data pattern cross product filter 1302 is shown in FIG. 14. It should be noted that the table 1402 includes information related to the D layer of pseudonoise coupled to the preamble. The data pattern cross product filter enables scrambling data on the preamble to be effectively removed, as previously discussed, while retaining the magnitude and angle information of the data vectors. Removal of the scrambling data from the preamble allows the vectors to be aligned, enabling the vectors to be added. The $B_f$ bin with the largest magnitude can be used to calculate the beat note of the received signal. A microprocessor can then assign that signal to a receiver, sending the receiver a substantially correct phase (correlation peak) and fine frequency offset of the signal to facilitate rapid synchronization of the receiver to the signal.

Figure 15:
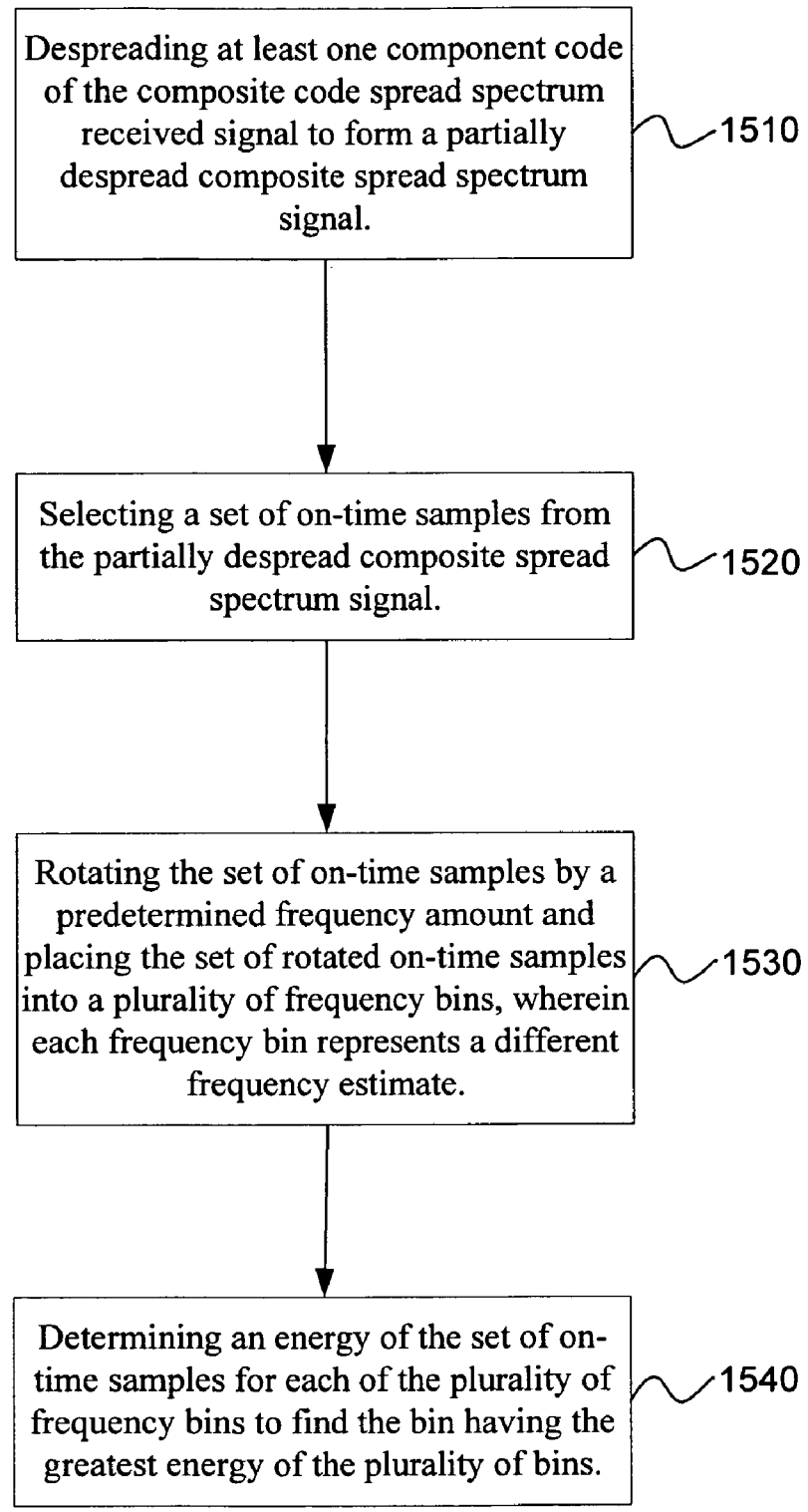
FIG. 15 depicts a flow chart for a method for determining a fine frequency offset of a received signal.

An additional embodiment of the present invention provides a method for determining a fine frequency offset of a composite code spread spectrum signal comprised of a plurality of component codes, as shown in the flow chart in FIG. 15. The method includes the operation of despreading at least one component code of the composite code spread spectrum signal to form a partially despread composite spread spectrum signal, as shown in block 1510. An additional operation provides selecting a set of on-time samples from the partially despread composite spread spectrum signal, as shown in block 1520. The set of on-time samples can be selected using information from the Coarse Frequency and Presence Detector. As previously disclosed, a substantially correct timing of the signal with respect to a frequency reference in the receiver can be determined using the Coarse Frequency and Presence Detector. This timing information can be passed to a control 1006, as shown in FIG. 10. The control can be used to select the set of on-time sub samples from the partially despread composite signal.

An additional operation provides the operation of rotating the set of on-time samples by a predetermined frequency amount and placing the set of rotated on-time samples into a plurality of frequency bins, wherein each frequency bin represents a different frequency estimate, as shown in block 1530 of FIG. 15. The predetermined frequency amount to rotate the samples by can be selected from the ACP output of the Coarse Frequency and Presence Detector, as shown in FIGS. 7a-9. Rotating the samples can substantially reduce the rotation of each sample relative to the frequency reference at the receiver. After rotating the samples, each sample can be rotated into a plurality of different frequency bins. Each frequency bin can represent a different frequency hypothesis.

A further operation includes determining an energy of the set of on-time samples for each of the plurality of frequency bins to find the bin having the greatest energy of the plurality of bins. The bin having the greatest energy can be assumed to be the most correct frequency hypothesis, where the received signal is synchronized the closest with the frequency reference at the receiver. The use of Accumulated Cross Product bins 1220, as shown in FIG. 12, can enable the magnitude and the frequency offset of each bin to be determined. This enables any remaining frequency difference between the received signal and the frequency reference at the receiver to be substantially removed, allowing the receiver to be substantially synchronized with the received signal, allowing the data on the received signal to be efficiently removed.

The various embodiments disclosed in this application can be incorporated using one or more digital signal processors, field programmable gate arrays, complex programmable logic devices, application specific integrated circuits, and/or discrete components as can be appreciated.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for use in a spread spectrum receiver for determining a fine frequency offset of a composite code spread spectrum signal having a plurality of component codes, comprising:

despreading at least one component code of the composite code spread spectrum signal to form a partially despread composite spread spectrum signal using a despreader;

selecting a set of on-time samples from the partially despread composite spread spectrum signal;

rotating the set of on-time samples by a predetermined frequency amount and placing the set of rotated on-time samples into a plurality of frequency bins, wherein each frequency bin represents a different frequency estimate; and determining an energy of the set of on-time samples for each of the plurality of frequency bins to find the bin having the greatest energy of the plurality of bins.

2. A method as in claim 1, wherein rotating the set of on-time samples further comprises de-rotating each sub-sample in each set of on-time samples by a predetermined amount.

3. A method as in claim 1, wherein rotating the set of on-time samples further comprises adding an additional rotation to each sub-sample in each set of on-time samples based on the bin that the set of on-time samples is going to be placed in.

4. A method for determining a fine frequency offset of a composite code spread spectrum signal having a plurality of component codes, comprising:

despreading at least one component code of the composite code spread spectrum signal to form a partially despread composite spread spectrum signal;

selecting a set of on-time samples from the partially despread composite spread spectrum signal;

rotating the set of on-time samples by a predetermined frequency amount and placing the set of rotated on-time samples into a plurality of frequency bins, wherein each frequency bin represents a different frequency estimate; and determining an energy of the set of on-time samples for each of the plurality of frequency bins to find the bin having the greatest energy of the plurality of bins, wherein rotating the set of on-time samples by a predetermined frequency amount further comprises rotating the set of on-time samples by a frequency offset measured by an accumulated cross product coarse search engine.

5. A method as in claim 1, further comprising selecting the set of on-time samples from a partially despread composite spread spectrum signal, wherein the composite signal is comprised of N+1 component codes, and wherein N is a positive integer.

6. A method as in claim 5, further comprising despreading N component codes of the composite spread spectrum signal.

7. A method as in claim 5, wherein selecting the set of on-time samples further comprises selecting the set of on-time samples, wherein the number of on-time samples is equivalent to $P_{N+1}$ chips.

8. A method as in claim 7, further comprising multiplying each chip of the set of on-time samples by an associated PN code to effectively remove the PN code.

9. A method as in claim 1, wherein determining an energy of the set of on-time samples for each of the plurality of bins further comprises summing each set of on-time samples and squaring the sum to obtain a magnitude.

10. A method as in claim 1, wherein determining an energy of the set of on-time samples for each of the plurality of bins further comprises determining an accumulated cross product for each set of on-time samples to obtain a magnitude and a frequency offset.

11. A method as in claim 10, further comprising determining a substantially correct phase and fine frequency offset value of a bin having the greatest energy of the plurality of bins for each of the substantially simultaneously received partially despread composite spread spectrum signals.

12. A method as in claim 1, further comprising removing a data pattern from a preamble of the partially despread spread spectrum signal.

13. A method as in claim 12, further comprising:
determining a cross product of each data vector sub-sample in the preamble with a proximate data vector sub-sample; and
multiplying each filter tap in the preamble by a complex conjugate of a proximate filter tap to effectively remove the data pattern from the preamble.

14. A method for use in a spread spectrum receiver for determining a fine frequency offset of a received signal, comprising:
selecting a set of on-time samples from a partially despread composite spread spectrum signal;
rotating the set of on-time samples by a predetermined frequency amount using a multiplier and placing the set of rotated on-time samples into a plurality of frequency bins using a commutator, wherein each frequency bin represents a different frequency estimate; and
determining a magnitude and angle offset of the set of on-time samples for each of the plurality of bins.

15. A method as in claim 14, further comprising calculating a substantially correct phase and fine frequency offset for the set of on-time samples in the bin having the greatest magnitude of the plurality of bins, wherein the phase and fine frequency offset are determined from the angle offset and magnitude of the set of on-time samples.

16. A method as in claim 15, further comprising sending the substantially correct phase and fine frequency offset for the set of on-time samples in the bin having the greatest magnitude of the plurality of bins.

17. A method as in claim 14, further comprising multiplying each sub-sample of the set of on-time samples by a complex conjugate of a proximate sub-sample to form a plurality of sub-sample pairs.

18. A method as in claim 17, further comprising summing the plurality of sub-sample pairs over a predetermined dwell time period to form a data vector having the magnitude and the angle offset.

19. A method as in claim 18, further comprising multiplying the data vector by its complex conjugate to derive an accumulated cross product detection energy value for a slip time.

20. A system for determining a fine frequency offset of a composite code spread spectrum signal, comprising:
a despreader to partially despread a composite signal;
a control configured to select a set of on-time sub samples from the partially despread composite signal;
a sub-sample rotation table configured to rotate the set of on-time sub samples by a predetermined frequency amount;
a commutator configured to rotate the set of on-time sub samples into a plurality of frequency bins, wherein each frequency bin is offset from the previous frequency bin by a predetermined amount of frequency;
an energy accumulator configured to determine an energy level of the set of on-time sub samples.

21. A system as in claim 20, wherein the energy accumulator is a pseudonoise correlation accumulator configured to determine a magnitude of the set of on-time sub samples for each frequency bin.

22. A system as in claim 20, wherein the energy accumulator is an accumulated cross product bin configured to determine a magnitude and a frequency offset of the set of on-time sub samples for each frequency bin.

* * * * *

UNITED STATES PATENT AND TRADEMARK OFFICE
CERTIFICATE OF CORRECTION

| | | |
|---|---|---|
| PATENT NO. | : 7,602,834 B1 | Page 1 of 1 |
| APPLICATION NO. | : 11/540139 | |
| DATED | : October 13, 2009 | |
| INVENTOR(S) | : Thomas R. Giallorenzi et al. | |

It is certified that error appears in the above-identified patent and that said Letters Patent is hereby corrected as shown below:

In column 2, line 15, "=0.10,000" should be "10,000"

In column 3, line 63, "AO" should be "$\Delta\theta$"

In column 10, line 36, "AO" should be "$\Delta\theta$"

Signed and Sealed this

Fourth Day of May, 2010

David J. Kappos
*Director of the United States Patent and Trademark Office*